United States Patent [19]
Kolb et al.

[11] Patent Number: 5,604,866
[45] Date of Patent: Feb. 18, 1997

[54] FLOW CONTROL SYSTEM HAVING A COUNTER IN TRANSMITTER FOR DECREMENTING AND INCREMENTING BASED UPON TRANSMITTING AND RECEIVED MESSAGE SIZE RESPECTIVELY FOR INDICATING FREE SPACE IN RECEIVER

[75] Inventors: Ronald L. Kolb, Milpitas; Ramesh Padmanabhan, San Jose; Eric M. Williams, Palo Alto, all of Calif.

[73] Assignee: Silicon Graphics, Inc., Mountain View, Calif.

[21] Appl. No.: 128,722

[22] Filed: Sep. 30, 1993

[51] Int. Cl.[6] ................................................ G06F 13/00
[52] U.S. Cl. ............... 395/200.13; 364/550; 370/235; 395/849; 395/854; 395/872; 395/877; 395/250
[58] Field of Search ................................. 395/250, 275, 395/200.13, 849, 854, 872, 877; 370/94.1; 364/550

[56] References Cited

U.S. PATENT DOCUMENTS

| | | | |
|---|---|---|---|
| 4,325,063 | 4/1982 | Herman | 340/750 |
| 4,527,233 | 7/1985 | Ambrosius, III et al. | 364/200 |
| 4,604,682 | 8/1986 | Schwan et al. | 364/200 |
| 4,740,958 | 4/1988 | Duxbury et al. | 370/94 |
| 4,942,515 | 7/1990 | Marzucco et al. | 364/200 |
| 4,965,793 | 10/1990 | Polzin et al. | 370/94.1 |
| 5,003,463 | 3/1991 | Coyle et al. | 364/200 |
| 5,295,246 | 3/1994 | Bischoff et al. | 395/250 |

Primary Examiner—Thomas C. Lee
Assistant Examiner—Po C. Huang
Attorney, Agent, or Firm—Sterne, Kessler, Goldstein & Fox, P.L.L.C.

[57] ABSTRACT

A system and method for controlling the flow of messages transferred between modules of a computer system is disclosed. The system includes a receiver module comprising a buffer having a capacity to store a predetermined number of messages, and a transmitter module coupled to the receiver module. The transmitter module includes a counter for maintaining a count value representative of free space in the buffer. The transmitter module transmits a message to the buffer when the count value is greater than zero. Then, the transmitter module decrements the count value by a value characteristic of the transmitted message, such that the count value is updated to be representative of free space in the buffer after transmission of the message to the buffer.

8 Claims, 5 Drawing Sheets

FLOW CONTROL SYSTEM HAVING A COUNTER IN TRANSMITTER FOR DECREMENTING AND INCREMENTING BASED UPON TRANSMITTING AND RECEIVED MESSAGE SIZE RESPECTIVELY FOR INDICATING FREE SPACE IN RECEIVER

BACKGROUND OF THE INVENTION

1. Field of the Invention

The present invention relates generally to computer systems, and more particularly to a system and method for implementing flow control in computer systems.

2. Related Art

As is well known, a central processing unit (CPU) often interacts with input/output (I/O) devices via programmed input/output (PIO) instructions. For example, a CPU may send a read PIO instruction to an I/O device when it wishes the I/O device to read data from a location. The CPU may send a write PIO instruction to an I/O device when it wishes the I/O device to write data a location.

A CPU sends a PIO instruction to an I/O device via a bus. Conventionally, the I/O device has a first-in first-out (FIFO) buffer for storing PIO instructions received from the CPU. When the I/O device is ready to process a PIO instruction, the I/O device extracts a PIO instruction from the FIFO buffer. Then, the I/O device processes the extracted PIO instruction.

As will be appreciated, the size of the FIFO buffer in the I/O device is finite. Also, the CPU may send PIO instructions to the I/O device at a rate faster than the rate at which the I/O device can process the PIO instructions. This represents a problem, since the CPU may attempt to send additional PIO instructions to the I/O device after the I/O device's FIFO buffer is full. This is called the flow control problem.

A first conventional solution to the flow control problem involves an acknowledgment (Ack), negative acknowledgment (Nack) handshaking scheme. In the first conventional solution, the I/O device sends an Ack signal to the CPU when it has received and stored a PIO instruction in its FIFO buffer (that is, when there is room in the I/O device's FIFO buffer to store the PIO instruction received from the CPU). The I/O device sends a Nack signal to the CPU when it has received and discarded a PIO instruction (that is, when there is not enough room in the I/O device's FIFO buffer to store the PIO instruction received from the CPU). When the CPU receives a Nack signal from the I/O device, the CPU resends the PIO instruction to the I/O device at a later time.

The first conventional solution is flawed because it reduces the effective throughput of the bus. This is the case, since the first conventional solution requires the I/O device to transmit Ack and Nack signals to the CPU, and since it requires the CPU to retransmit PIO instructions when it receives a Nack signal from the I/O device. The transmission of these messages over the bus (particularly the retransmission of PIO instructions from the CPU to I/O devices) represents overhead that results in reducing the effective throughput of the bus.

A second conventional solution to the flow control problem requires that the I/O device transmit a "buffer full" message to the CPU when its FIFO buffer is full. The I/O device transmits a "buffer not full" message to the CPU when its FIFO buffer is not full. When the CPU receives a "buffer full" message, the CPU discontinues sending PIO instructions to the I/O device, and does not begin sending more PIO instructions to the I/O device until it receives a "buffer not full" message from the I/O device.

The second conventional solution solves the problem of the first conventional solution, since the second conventional solution does not require the CPU to retransmit PIO instructions to I/O devices. However, the second conventional solution suffers from a latency problem.

As will be appreciated, a certain amount of time passes between the transmission of a "buffer full" message by the I/O device, and the receipt of the "buffer full" message by the CPU. During this time, the CPU may send one or more PIO instructions to the I/O device. The I/O device must have room in its FIFO buffer to store these PIO instructions (otherwise, the second conventional solution would not represent a complete solution to the flow control problem).

Most conventional systems solve this "latency" problem by having the I/O device send the "buffer full" message when its FIFO buffer is only partially full. The remaining capacity (also called "slack") of the FIFO buffer is used to accommodate any PIO instructions sent by the CPU after the transmission of the "buffer full" message. This solution is flawed, however, since it solves the latency problem at the expense of storage capacity of the I/O device's FIFO buffer. That is, this solution is flawed because the I/O device regularly cannot use the complete capacity of its FIFO buffer to store PIO instructions. This is the case, since a portion of the FIFO buffer must be reserved for PIO instructions sent by the CPU after the transmission of the "buffer full" message (this reserved portion of the FIFO buffer is called latency overhead).

A third conventional solution to the flow control problem requires that the I/O device transmit a "Request for PIO instruction" message to the CPU when it wants the CPU to transmit a PIO instruction. When the CPU receives the "Request for PIO instruction" message, the CPU sends a PIO instruction to the I/O device. The third conventional solution is flawed, however, since it results in a great deal of latency between when the CPU receives a PIO instruction (from a client process, for example), and when the CPU transmits the PIO instruction to the I/O device. This is the case, since the CPU must wait until it receives a "Request for PIO instruction" message to send a PIO instruction.

SUMMARY OF THE INVENTION

Briefly stated, the present invention is directed to a system and method for controlling the flow of messages transferred between modules of a computer system. The system includes a receiver module comprising a buffer having a capacity to store a predetermined number of messages, and a transmitter module coupled to the receiver module.

The transmitter module includes a counter for maintaining a count value representative of free space in the buffer, means coupled to the counter for transmitting a message to the buffer when the count value is greater than zero, and means responsive to such transmission for decrementing the count value by a value characteristic of the transmitted message. In this manner, the count value is updated to be representative of free space in the buffer after transmission of the message to the buffer.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention will be described with reference to the accompanying drawings, wherein.

DETAILED DESCRIPTION OF THE PREFERRED EMBODIMENTS

The present invention is directed to a system and method for implementing flow control in a computer system. For illustrative purposes, the present invention is described herein with respect to controlling the flow of programmed input/output (PIO) instructions from a processor to I/O devices via a bus. However, the present invention is applicable to controlling the flow of any type of messages among any type of devices over any number of interconnected buses, wherein there is a transmission latency (or delay) involved in transmitting a message from a first device to a second device via the interconnected buses. That is, there is a delay between the transmission of the message by the first device, and the receipt of the message by the second device.

In accordance with a preferred embodiment of the present invention, a sender (such as a processor) sends PIO instructions to receivers (such as I/O devices) via a bus. Each receiver has a buffer (preferably, a FIFO buffer) for storing PIO instructions received from the sender. The sender maintains a count of the available (or unused) buffer space for each possible receiver. For example, if the count for a receiver is 3, then the sender knows that there is room for three additional PIO instructions in the receiver's buffer.

The sender only sends a PIO instruction to a receiver when the receiver's count is greater than zero. When the sender sends a PIO instruction to a receiver, the sender decrements by one the count associated with the receiver.

When a receiver frees space in its buffer, the receiver sends an increments PIO (IncPIO) signal to the sender. The receiver frees space in its buffer by extracting and processing a PIO instruction from its buffer. When the sender receives an IncPIO signal from a receiver, the sender increments by one the count associated with the receiver.

The flow control system and method of the present invention solves the problems associated with conventional systems. For example, the present invention does not require the receiver to send Nack signals to the sender, and does not require the sender to retransmit PIO instructions. Thus, the present invention does not degrade the throughput of the bus. Also, the present invention does not result in latency overhead. Since the flow control protocol does not require the receivers to tell the sender when to send PIO instructions and when to not send PIO instructions, the entire receiver buffers can be used to store PIO instructions. Further, the present invention minimizes the latency between receipt of a PIO instruction by the sender, and transmission of the PIO instruction from the sender to a receiver. Some latency is possible, since the sender increments the receiver counts only upon receipt of IncPIO signals from the receivers. However, the sender is allowed to send PIO instructions to a receiver as long as the count associated with the receiver is greater than zero. This is true, irrespective of whether the sender has received an IncPIO signal-from the receiver.

The present invention shall now be described in detail.

Figure 1A:
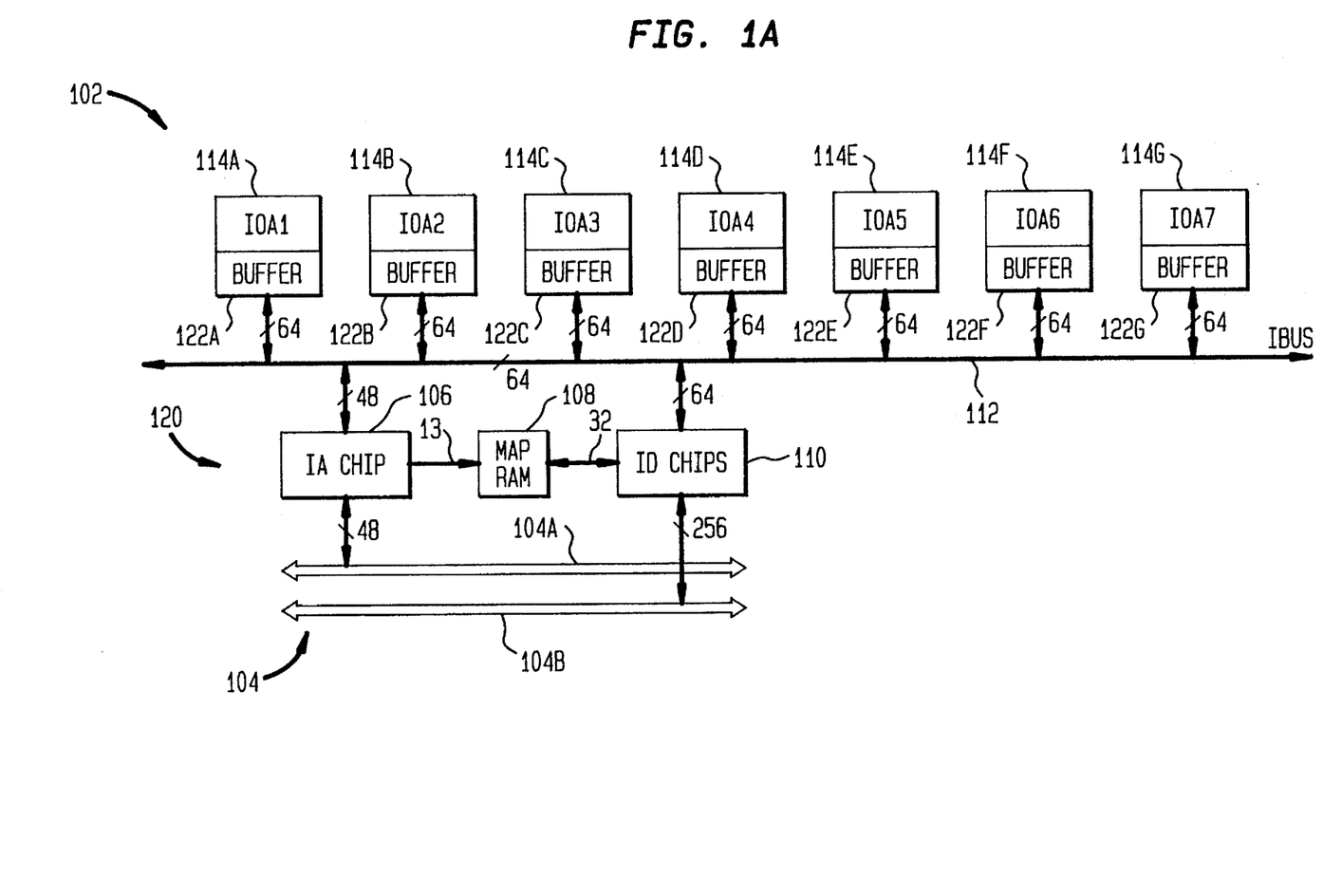
FIG. 1A is a block diagram of a computer system in accordance with a preferred embodiment of the present invention.

FIG. 1A is a block diagram of a computer system 102 in accordance with a preferred embodiment of the present invention. The computer system 102 includes a system bus 104 comprising an address bus 104A and a data bus 104B. The computer system 102 also includes an input/output (I/O) bus 112.

An I/O control module 120 links the system bus 104 to the I/O bus 112. The I/O control module 120 controls the transfer of data between devices connected to the system bus 104 and devices connected to the I/O bus 112. In particular, the I/O control module 120 controls the flow of messages from devices connected to the system bus 104 to devices connected to the I/O bus 112. In other words, the I/O control module 120 implements flow control for the computer system 102. This is further described below.

The I/O control module 120 includes an I/O address (IA) chip or module 106, an I/O data (ID) chips or module 110, and a map random access memory (RAM) 108. The IA chip 106 controls addressing on the I/O bus 112. The ID chip 110 controls the placement and transfer of data on the I/O bus 112.

The ID chip 110 and the map RAM 108 do not form a part of the present invention, and therefore shall not be discussed further.

Many of the functions of the IA chip 106 are beyond the scope of the present invention. These functions are not discussed herein. However, the IA chip 106 controls the flow of messages from devices connected to the system bus 104 to devices connected to the I/O bus 112. In other words, the IA chip 106 implements flow control for the computer system 102. This operation of the IA chip 106, and the structure of the IA chip 106 devoted to this operation, are described in detail below. It should be noted at this point, however, that the IA chip 106 represents the "sender" from the above, general description of the present invention.

One or more input/output adapters (IOA) 114 are connected to the I/O bus 112. Preferably, there are seven IOAs 114. The IOAs 114 are each connected to one or more I/O devices (not shown), such as disk drives, graphical displays, secondary buses, etc. The IOAs 114 control the operation of such I/O devices. Input/output adapters are generally well known, and are described in many publicly available documents, such as *Computer Architecture: A Quantitative Approach* by Hennessy and Patterson (1990), which is herein incorporated by reference in its entirety. The aspects of the IOAs 114 with regard to flow control are not well known. These aspects of the IOAs 114 are described in detail below. It should be noted at this point, however, that the IOAs 114 represent the "receivers" from the above, general description of the present invention.

The I/O bus 112 preferably comprises 64 wires (that is, the I/O bus 112 is 64 bits wide). These wires of the I/O bus 112 are used to transfer both data and address information. Each of the IOAs 114 is connected to all 64 wires of the I/O bus 112. The ID chip 110 is also connected to all 64 wires of the I/O bus 112, and uses the entire I/O bus 112 to transfer data via the I/O bus 112. The IA chip 106 is preferably connected to only 48 wires of the I/O bus 112, and uses only these 48 wires of the I/O bus 112 to transfer addresses via the I/O bus 112.

In addition to the 64 wires of the I/O bus 112 shown in FIG. 1A, the I/O bus 112 also preferably includes at least 21 control lines (not shown). The IA chip 106 receives all 21 of these control lines. The IOAs 114 each receive a unique three of the control lines.

The control lines are used to transfer command messages between the IOAs 114 and the IA chip 106. Since each IOA 114 is connected to three of the control lines, eight different command messages can be sent from the IA chip 106 to each IOA 114, and eight different command messages can be sent from each IOA 114 to the IA chip 106.

As noted above, the IA chip 106 represents the "sender" from the above general description of the present invention, and the IOAs 114 represent the "receivers." Preferably, the IA chip 106 sends PIO instructions to the IOAs 114 via the I/O bus 112. The IOAs 114 send IncPIO messages to the IA chip 106 via their respective control lines. Preferably, an IncPIO message is coded on the control lines as follows: "001"

Each of the IOAs 114 includes an IOA buffer 122 for storing PIO instructions received from the IA chip 106 via the I/O bus 112. The IOA buffers 122 are preferably first-in first out buffers, and are preferably implemented using random access memory contained in the IOAs 114, but may alternatively be implemented using other means, such as registers.

The IOA buffers 122 each have a capacity to store a predetermined number of PIO instructions. Preferably, each IOA buffer 122 can store eight PIO instructions. However, IOA buffers 122 having a capacity to store other numbers of PIO instructions are within the scope and spirit of the present invention.

Preferably, all PIO instructions are of the same, predetermined nominal size. In this case, the capacity of the IOA buffers 122 is based on this predetermined nominal size. Alternatively, PIO instructions vary in size, but do not exceed a predetermined maximum size. In this alternate case, the capacity of the IOA buffers 122 is based on this predetermined maximum size.

Figure 1B:
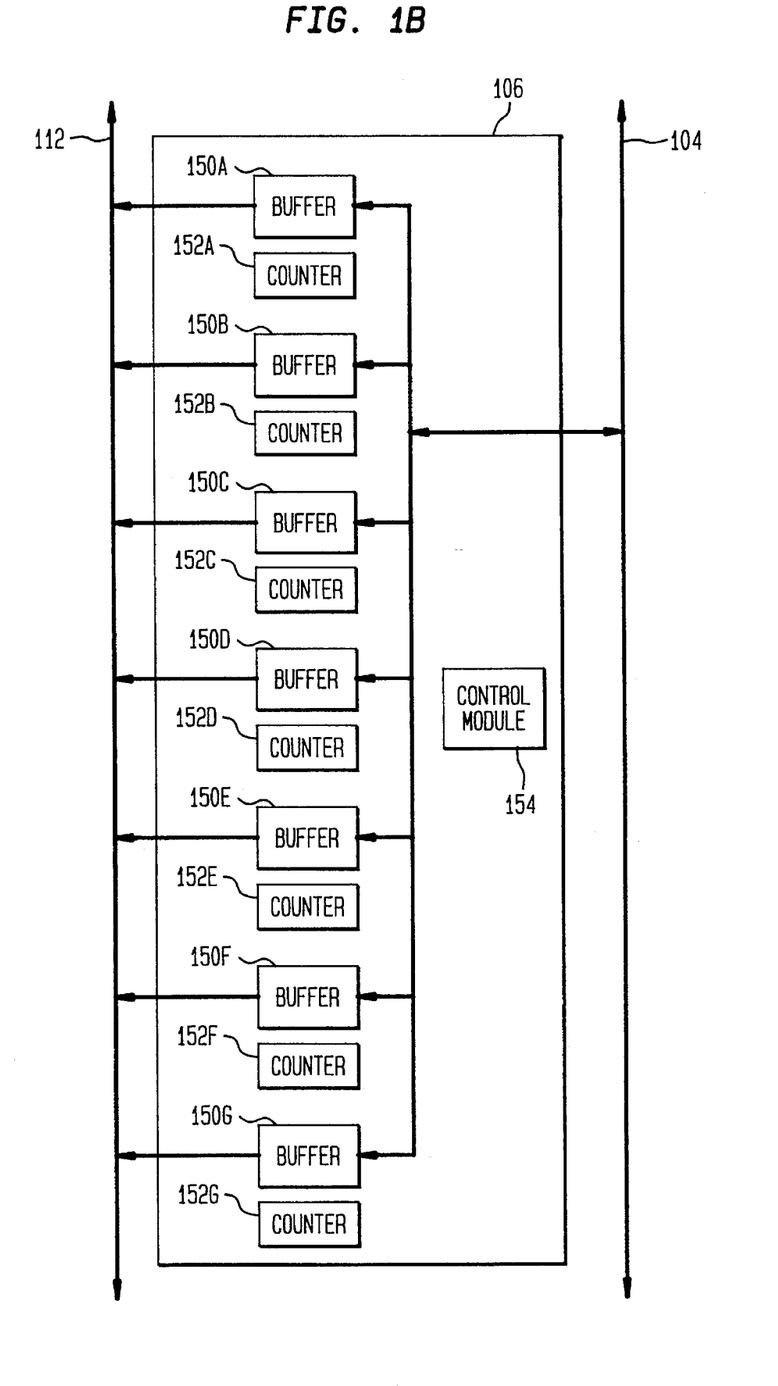
FIG. 1B is a block diagram of a input/output (I/O) adapter chip in accordance with a preferred embodiment of the present invention.

FIG. 1B is a more detailed block diagram of the IA chip 106. The IA chip 106 preferably includes a holding buffer 150 for each of the IOAs 114 connected to the I/O bus 112. The holding buffers 150 are connected to both the system bus 104 and the I/O bus 112. Preferably, each of the holding buffers 150 is a first-in first-out (FIFO) buffer.

The holding buffers 150 store PIO instructions which the IA chip 106 receives from other devices (not shown) connected to the system bus 104, such as processors. As described in detail below, the PIO instructions are eventually transferred from the holding buffers 150 to the respective IOA buffers 122 in the appropriate IOAs 114.

The holding buffers 150 may be implemented using registers or memory contained in the IA chip 106. Alternatively, the holding buffers 150 may be implemented using the map RAM 108. For purposes of discussion, it is assumed that the holding buffers 150 are of size sufficient to hold any number of PIO instructions. If, alternatively, the holding buffers 150 are of smaller size, then the flow control mechanism of the present invention could be used to control the flow of PIO instructions into the holding buffers 150.

The IA chip 106 also preferably includes a counter 152 for each of the IOAs 114 connected to the I/O bus 112. The counter 152 maintains a count of free space in the IOA buffers 122 contained in each of the IOAs 114. For example, if the counter 152A associated with the IOA 114A is equal to 5, then the IOA buffer 122A in the IOA 114A has enough free space to store an additional five PIO instructions. The counters 152 may be implemented as shift registers or may represent storage locations in the map RAM 108. Other ways for implementing the counters 152 will be apparent to persons skilled in the relevant art.

The IA chip 106 also includes a control module 154. The IA chip 106 operates in accordance with instructions from the control module 154. The control module 154 is preferably implemented as a hardwired state machine, but could be implemented using other means, such as a central processing unit (CPU) operating in accordance with software stored in a memory device, such as the map RAM 108.

The operation of the present invention shall now be described in detail.

Figure 2:
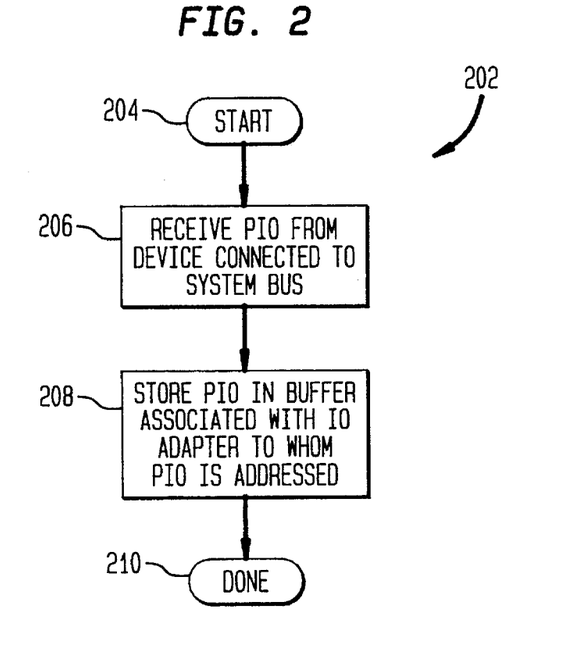
FIGS. 2–4 illustrate flowcharts depicting the operation of the present invention.

FIG. 2 is a flowchart 202 depicting the operation of the IA chip 106 when the IA chip 106 receives a PIO instruction from a device (not shown) connected to the system bus 104. The flowchart 202 begins with step 204, where control immediately passes to step 206.

In step 206, the IA chip 106 receives a PIO instruction from a device (not shown) connected to the system bus 104. The PIO instruction preferably includes an address field containing address information which identifies the destination of the PIO instruction. Specifically, the address information in the address field identifies one of the IOAs 114, wherein the IOA 114 identified by the address information represents the destination of the PIO instruction.

In step 208, the IA chip 106 (operating according to instructions from the control module 154) stores the PIO instruction in the holding buffer 150 associated with the IOA 114 identified by the address information. For example, if the address information identifies the IOA 114F, then the IA chip 106 stores the PIO instruction in the holding buffer 150F. After performing step 208, the operation of the IA chip 106 with regard to the flowchart 202 is complete, as indicated by oval 210.

Figure 3:
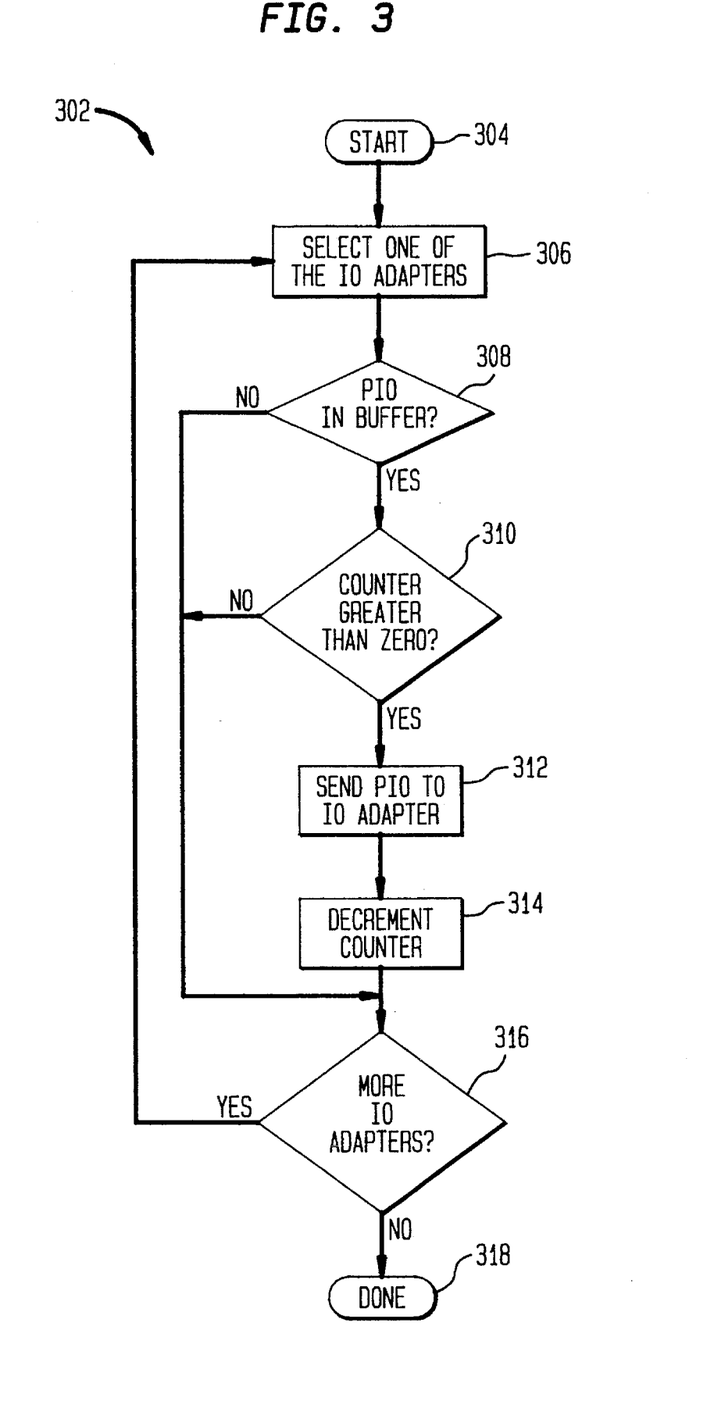

PIO instructions are stored in the holding buffers 150 until the IA chip 106 transfers the PIO instructions from the holding buffers 150 to the respective IOAs 114. FIG. 3 illustrates a flowchart 302 which depicts the manner in which the IA chip 106 transfers the PIO instructions from the holding buffers 150 to the respective IOAs 114. The flowchart 302 begins with step 304, where control immediately passes to step 306.

In step 306, the IA chip 106 selects one of the IOAs 114 for processing. As will become apparent, in performing the steps of the flowchart 302 the IA chip 106 processes each of the IOAs 114 in turn. For illustrative purposes, assume that the IA chip 106 selects the IOA 114A in step 306.

In step 308, the IA chip 106 determines whether any PIO instructions are stored in the holding buffer 150A associated with the IOA 114A selected in step 306. The IA chip 106 may maintain for each holding buffer 150 a count (not shown) of the number of PIO instructions stored in the associated holding buffer 150. The IA chip 106 would then check the appropriate count to perform step 308. Other ways for performing step 308 will be apparent to persons skilled in the relevant art.

If, in step 308, the IA chip 106 determines that a PIO instruction is not stored in the holding buffer 150A, then the IA chip 106 jumps to step 316 (described below). Otherwise, the IA chip 106 performs the series of steps beginning with step 310.

In step 310, the IA chip 106 accesses the counter 152A associated with the selected IOA 114A, and determines from the accessed counter 152A whether the IOA buffer 122A in the selected IOA 114A has sufficient free space to accept and store another PIO instruction. Preferably, in step 310 the IA chip 106 determines whether the count maintained by the counter 152A is greater than zero.

If, in step 310, the IA chip 106 determines that the count maintained by the counter 152A is not greater than zero, then the IA chip 106 jumps to step 316 (described below). Otherwise, the IA chip 106 performs the series of steps beginning with step 312.

In step 312, the IA chip 106 extracts a PIO instruction from the holding buffer 150A associated with the selected IOA 114A, and sends the extracted PIO instruction to the selected IOA 114A via the I/O bus 112. The selected IOA 114A receives the PIO instruction sent to it by the IA chip 106, and stores the received PIO instruction in its IOA buffer 122A.

In step 314, the IA chip 106 decrements by one the count maintained in the counter 152A associated with the selected IOA 114A. Thus, in step 314, the IA chip 106 updates its information pertaining to the amount of free space in the IOA buffer 122A associated with the selected IOA 114A.

In one embodiment of the present invention (which is not shown in FIG. 3), the IA chip 106 loops back to step 308 after performing step 314. In this manner, the IA chip 106 transfers as many PIO instructions as possible to the selected IOA 114A before selecting another IOA 114 (in step 306).

In an alternate embodiment of the present invention (which is shown in FIG. 3), the IA chip 106 performs step 316 after performing step 314. In step 316, the IA chip 106 determines whether there are any additional IOAs 114 to process. If there are additional IOAs 114 to process, then the IA chip 106 loops back to step 306 to select the next IOA 114. Otherwise, the operation of the IA chip 106 which regard to the current iteration of transferring PIO instructions to the IOAs 114 is complete.

Preferably, the IA chip 106 periodically performs the steps shown in FIG. 3. The frequency at which the IA chip 106 performs the steps shown in FIG. 3 is implementation dependent, and may depend on many factors, such as the other tasks which the IA chip 106 is required to perform, the size of the holding buffers 150 and the IOA buffers 122, the processing speed of the IOAs 114, etc.

Figure 4:
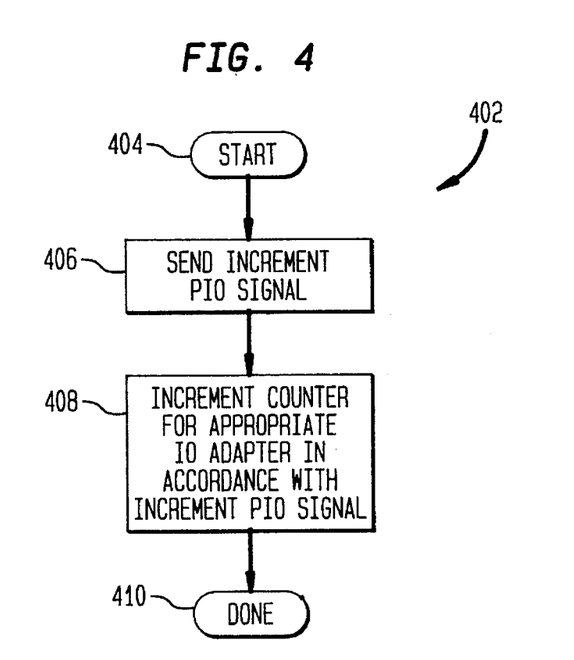

FIG. 4 illustrates a flowchart 402 which depicts the operation of the IA chip 106 and the IOAs 114 in accordance with a preferred embodiment of the present invention. In particular, the flowchart 402 illustrates the manner in which an IOA 114 causes the IA chip 106 to update the count maintained in the counter 152 associated with the IOA 114 when the IOA 114 extracts and processes a PIO instruction from its IOA buffer 122. For illustrative purposes, the flowchart 402 is described with respect to the IOA 114C sending an IncPIO message to the IA chip 106.

The flowchart 402 begins with step 404, where control immediately passes to step 406.

Prior to step 406, the IOA 114C has extracted a PIO instruction from its associated IOA buffer 122C, and has processed (or retired) the extracted PIO instruction. After extracting and processing the PIO instruction, the IOA buffer 122C has free space for storing one additional PIO instruction.

In step 406, the IOA 114C sends an increment PIO (IncPIO) signal to the IA chip 106 via the three control lines (not shown) dedicated to the IOA 114C. As discussed above, the IOA 114C and the IA chip 106 are connected to these three control lines.

In step 408, the IA chip 106 receives the IncPIO signal from the IOA 114C. In response to receipt of the IncPIO signal from the IOA 114C, the IA chip 106 increments by one the count maintained by the counter 152C associated with the IOA 114C. Thus, in step 408, the IA chip 106 updates its information pertaining to the amount of free space in the IOA buffer 122C associated with the IOA 114C who sent the IncPIO signal.

After performing step 408, the operation of the IA chip 106 and the IOA 114C with regard to the flowchart 402 is complete, as indicated by oval 410.

Upon power up of the computer system 102, or upon reset of the computer system 102, the counts maintained by the counters 152 in the IA chip 106 are preferably set to zero. Each of the IOAs 114 preferably initializes the counts maintained by their respective counters 152 by sending one or more IncPIO messages to the IA chip 106. For example, if upon power up or system reset the IOA 114G has free space in its IOA buffer 122G to receive and store five PIO instructions, then the IOA 114G would send five IncPIO messages to the IA chip 106.

Since the IOAs 114 use this protocol to essentially inform the IA chip 106 of the respective storage capacities of their IOA buffers 122, the present invention facilitates the incorporation of new and/or different IOAs 114 into the computer system 102. Also, the present invention supports without modification IOAs 114 having different size IOA buffers 122.

As discussed above, IncPIO messages are sent on control lines which are connected to the IOAs 114 and the IA chip 106. Other types of control messages are also sent on these control lines, such as read request messages, DMA write request messages, read response messages, interrupt messages, etc. In an alternate embodiment of the present invention, IncPIO messages are sent on control lines (not shown) which are dedicated for the transmission of IncPIO messages. Alternatively, IncPIO messages could be sent from the IOAs 114 to the IA chip 106 using the I/O bus 112. In this alternate embodiment, control lines for the transmission of IncPIO messages would not be required.

As discussed above, the IOA buffers 122 are preferably assumed to each have a capacity to store a predetermined, fixed number of PIO instructions. This scheme is acceptable when all PIO instructions are of the same, predetermined nominal size. However, this scheme may inefficiently use the storage space of the IOA buffers 122 when PIO instructions vary in size (but do not exceed a predetermined maximum size). This is true, since the capacity of the IOA buffers 122 is calculated using a worst case analysis based on this predetermined maximum size.

In an alternate embodiment of the present invention, the counters 152 maintain counts of the number of free bytes in the IOA buffers 122. For example, a count of 1000 in the counter 152G would indicate that there is 1000 bytes of free space in the IOA buffer 122G of the IOA 114G.

The operation of the IA chip 106 and the IOAs 114 in accordance with this alternate embodiment would essentially be as shown in FIGS. 2–4. However, in step 314 of the flowchart 302 (FIG. 3), the IA chip 106 would decrement the count in the counter 152 associated with the selected IOA 114 (selected in step 306) by the size (in bytes) of the PIO instruction transferred to the selected IOA 114 in step 312.

In step 406 of the flowchart 402 (FIG. 4), the IncPIO message sent by the IOA 114 to the IA chip 106 would be coded to indicate the size (in bytes) of the PIO instruction which was retired by the IOA 114. In step 408, the IA chip 106 would increment the count in the counter 152 associated with the IOA 114 who sent the IncPIO message by the size of the retired PIO instruction as indicated by the IncPIO message.

As noted above, the present invention has been described herein with respect to controlling the flow of programmed input/output (PIO) instructions from a processor to I/O devices via a bus. However, the present invention is applicable to controlling the flow of any type of messages among any type of devices over any number of interconnected buses, wherein there is a transmission latency (or delay) involved in transmitting a message from a first device to a second device via the interconnected buses.

Figure 5:
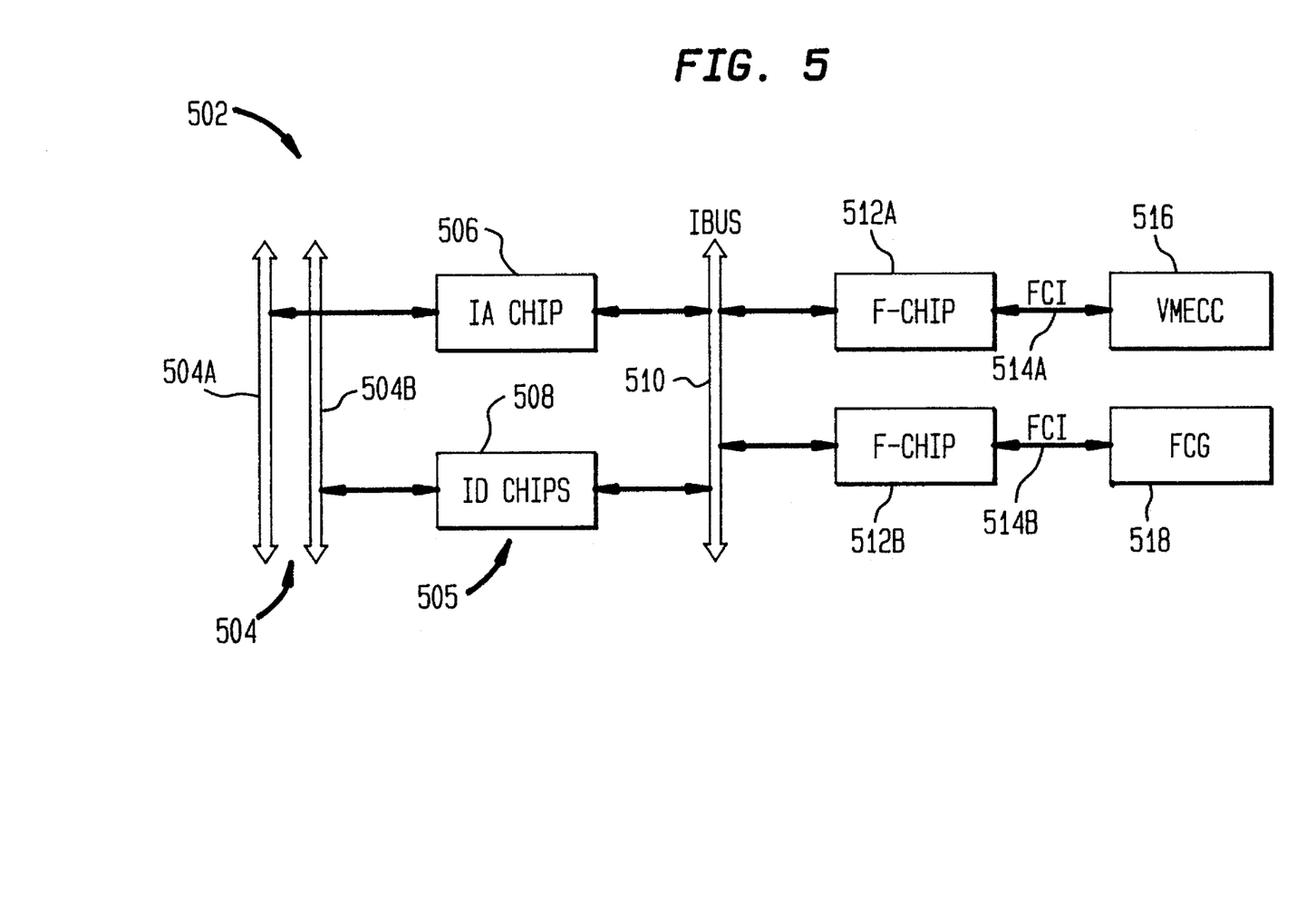
FIG. 5 is a block diagram of a computer system in accordance with an alternate embodiment of the present invention.

For example, the flow control mechanism of the present invention can be used to control the flow of messages in a computer system which uses a flat cable interface (FCI). FIG. 5 is a block diagram of a computer system 502 which utilizes a flat cable interface 514 in accordance with an alternate embodiment of the present invention.

The computer system 502 includes a system bus 504 having an address bus 504A and a data bus 504B. The computer system 502 also includes an I/O bus 510.

An I/O control module 505 links the system bus 504 to the I/O bus 510. The I/O control module 505 in FIG. 5 is similar to the I/O control module 120 shown in FIG. 1A. In particular, the I/O control module 505 in FIG. 5 includes an I/O address (IA) chip or module 506 and an I/O data (ID) chip or module 508. These modules are similar to the IA chip 106 and the ID chip 110, respectively, shown in FIG. 1A. The IA chip 106 controls the flow of messages from devices (not shown) connected to the system bus 504 to devices connected to the I/O bus 510. In other words, the IA chip 506 implements flow control for the computer system 502.

Connected to the I/O bus 510 are one or more flat cable chips 512 (labeled "F-Chip" in FIG. 5). The flat cable chips 512 are analogous in operation to the IOAs 114 shown in FIG. 1A. Connected to each of the flat cable chips 512 is an I/O device, such as a Versa Module Europe cache controller (VMECC) 516, which is a bus controller for an industry standard VME bus, and a flat cable graphics (FCG) device, which represents an interface to a graphics system.

Each of the F-Chips 512 includes a buffer for storing PIO instructions received via the I/O bus 510 from the IA chip 506. The IA chip 506 includes a holding buffer and a counter for each of the F-Chips 512, wherein the counters maintain counts of the available free space in the F-Chips's buffers.

The operation of the computer system 502 (in FIG. 5) with respect to flow control is similar to the operation of the computer system 102 (in FIG. 1A) with respect to flow control. For example, when the IA chip 506 sends a PIO instruction to a F-Chip 512, the IA chip 506 decrements by one the count in the counter associated with the F-Chip 512. When a F-Chip 512 retires a PIO instruction, the F-Chip 512 sends an IncPIO message to the IA chip 506. In response to receipt of the IncPIO message, the IA chip 506 increments by one the count maintained in the counter associated with the F-Chip 512 which sent the IncPIO message.

Preferably, the present invention is also used to control the flow of messages over the FCI buses 514. Specifically, the VMECC 516 and the FCG 518 each preferably includes a buffer for storing PIO instructions received via the respective FCI buses 514 from the respective F-Chips 512. Each of the F-Chips 512 includes a holding buffer and a counter, wherein the counter in the F-Chip 512A maintains a count of the available free space in the VMECC 516's buffer, and the counter in the F-Chip 512B maintains a count of the available free space in the FCG 518's buffer. The operation of the F-Chips 512 and the VMECC 516 and FCG 518 with respect to flow control over the FCI buses 5 14 according to the present invention will be apparent to persons skilled in the relevant art based on the discussion above.

Note that when flow control over the I/O bus 510 and the FCI buses 514 is implemented according to the present invention, the buffers in the F-Chips 512 which are used to receive and store PIO instructions sent from the IA chip 506 over the I/O bus 510 are the same holding buffers in the F-Chips 512 which are used to hold PIO instructions until respectively sent to the VMECC 516 and the FCG 518 over the respective FCI buses 514.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for controlling the flow of messages transferred between modules of a computer system, comprising:

a plurality of receiver modules, each receiver module comprising a buffer having a capacity to store a number of messages;

a transmitter module, coupled to each of said receiver modules, comprising:

a plurality of counters, one for each of said plurality of receiver modules, for maintaining a count value representative of free space in said buffer of a receiver module;

transmission means, coupled to each of said counters, for transmitting a message having an address corresponding to one of said plurality of receiver modules to said buffer in said one of said plurality of receiver modules when a count value corresponding to said one of said plurality of receiver modules is greater than zero, wherein the size of said message is smaller than said count value;

decrementing means, responsive to said transmission, for decrementing said count value corresponding to said one of said plurality of receiver modules by a value equal to a size of said transmitted message, such that said count value corresponding to said one of said plurality of receiver modules is updated to be representative of free space in said buffer in said one of said plurality of receiver modules;

means for receiving an "Increment Count Value" message from said one of said plurality of receiver modules, wherein said "Increment Count Value" is representative of a size of a second message that has been retired from said buffer in said one of said plurality of receiver modules: and incrementing means responsive to receipt of said "Increment Count Value" message for incrementing said count value corresponding to said one of said plurality of receiver modules in accordance with said received "Increment Count Value" message such that said count value corresponding to said one of said plurality of receiver modules is updated to be representative of free space in said buffer in said one of said plurality of receiver modules after retirement of said second message from said buffer in said one of said plurality of receiver modules.

2. The system of claim 1 wherein each of said plurality of receiver modules further comprises:

retirement means for retiring said second message from said buffer in said one of said plurality of receiver modules; and receiver transmitting means for transmitting said "Increment Count Value" message to said transmitter module in response to said retirement of said second message.

3. The system of claim 2, further comprising at least one control line connecting said transmitter module to each of said plurality of receiver modules, wherein said transmitting means in each of said plurality of receiver modules transmits said "Increment Count Value" message to said transmitter module via said control line.

4. The system of claim 2, further comprising a bus connecting said transmitter module to each of said plurality of receiver modules, wherein said receiver transmitting means in each of said plurality of receiver modules transmits said "Increment Count Value" message to said transmitter module via said bus.

5. A method of controlling the flow of messages transferred between modules of a computer system, the computer system comprising a plurality of receiver modules, each of said receiver modules comprising a buffer having a capacity to store a number of messages, and a transmitter module coupled to each of the plurality of receiver modules, the method comprising the steps of:

(a) maintaining in the transmitter module count values representative of free space in the buffers of said plurality of receiver modules;

(b) transmitting a message, having an address corresponding to one of said plurality of receiver modules, from the transmitter module to the buffer in said one of said plurality of receiver modules when a count value corresponding to said one of said plurality of receiver modules is greater than zero, wherein the size of said message is smaller than said count value;

(c) decrementing in the transmitter module said count value corresponding to said one of said plurality of receiver modules by a value equal to a size of said transmitted message, such that said count value corresponding to said one of said plurality of receiver modules is updated to be representative of free space in the buffer in said one of said plurality of receiver modules;

(d) receiving in said transmitter module an "Increment Count Value" message from said one of said plurality of receiver modules, wherein said "Increment Count Value" is representative of a size of a second message that has been retired from said buffer of said one of said plurality of receiver modules: and (e) incrementing said count value corresponding to said one of said plurality of receiver modules in accordance with said received "Increment Count Value" message such that said count value corresponding to said one of said plurality of receiver modules is updated to be representative of free space in said buffer in said one of said plurality of receiver modules after retirement of said second message from said buffer in said one of said plurality of receiver modules.

6. The method of claim 5, further comprising the steps of:

(f) retiring said second message from the buffer in said one of said plurality of receiver modules; and (g) transmitting said "Increment Count Value" message to the transmitter module in response to said retirement of said second message.

7. A transmitter for transmitting a first message to a receiver module, said receiver module being one of a plurality of receiver modules, said receiver module including a buffer for storing a plurality of messages including a second message, said transmitter comprising:

a counter for maintaining a count value representative of free space in said buffer;

transmission means for transmitting said first message to said buffer in said receiver module when said count value is greater than the size of said first message;

decrementing means, responsive to said transmission, for decrementing said count value by a value equal to the size of said transmitted first message, such that said count value is updated to be representative of free space in said buffer;

means for receiving an "Increment Count Value" message from said receiver module, wherein said "Increment Count Value" message is representative of a size of said second message that has been retired from said buffer; and incrementing means, responsive to receipt of said "Increment Count Value" message, for incrementing said count value in accordance with said received "Increment Count Value" message, such that said count value is updated to be representative of free space in said buffer after retirement of said second message from said buffer.

8. The transmitter of claim 7, wherein said "Increment Count Value" message is encoded with the size of said second message, and wherein said incrementing means increments said count value by the size of said second message.

* * * * *